July 20, 1943.  H. H. ASBRIDGE  2,324,664
SPINDLE BEARING
Filed Aug. 20, 1941
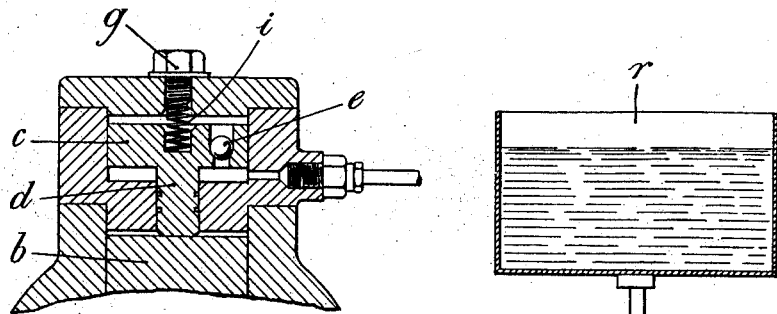
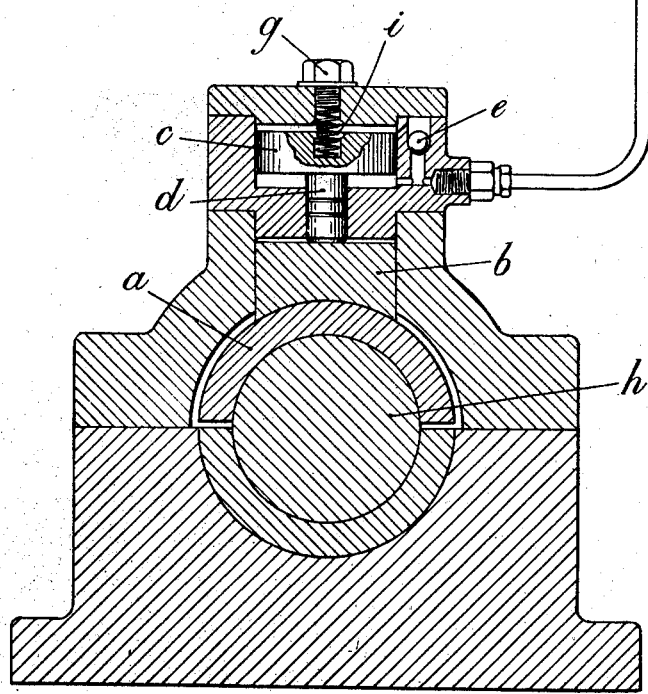
Inventor:
H. H. Asbridge
By: Glascock Downing & Seebold
Attys.

Patented July 20, 1943

2,324,664

UNITED STATES PATENT OFFICE 2,324,664

SPINDLE BEARING

Harry Hales Asbridge, Ashton-on-Mersey, England, assignor to The Churchill Machine Tool Company Limited, Broadheath, near Altrincham, England, a British company Application August 20, 1941, Serial No. 407,664
In Great Britain September 13, 1940

5 Claims. (Cl. 308—9)

This invention relates to spindle journal bearings such as are used in machine tools where the maintenance of a close running fit is essential.

In the specification of my prior Patent No. 2,028,487 and application Serial No. 284,982, I have described hydraulically loaded bearings in which the hydraulic fluid is trapped at one side of the piston to resist any lifting movement of the bearing.

In accordance with the present invention, the piston which loads the bearing and prevents lifting thereof is spring loaded and has hydraulic fluid applied thereto and trapped at one side of the piston to prevent lifting of the bearing but not for the purpose of applying any load additional to the spring load. In other words my present invention comprises the combination with a spring loading of the bearing for running adjustment of a hydraulic lock to prevent lifting thereof.

In the accompanying explanatory drawing:

Figure 1 is a sectional view of a bearing constructed and arranged in one convenient form in accordance with this invention.

Figure 2 shows a modification.

The loading of the bearing bronze or shoe $a$ is effected through a pad or block $b$ by the piston $c$, the rod $d$ of which engages the pad or block which bears upon and may be secured to said bronze or shoe. A compression coil spring $i$ applies the desired load to the piston for running adjustment.

The locking of the piston $c$ against any lifting movement so as to prevent any lifting of the bearing which may result from working conditions of the shaft $h$, is effected by hydraulic fluid which is supplied by the reservoir tank $r$ to both sides of the piston $c$ so that there is a negligible resultant hydraulic loading pressure applied by the piston $c$ to the bronze or shoe $a$. This pressure is represented by the pressure head of the fluid applied to the area of the piston rod section. The hydraulic fluid supplied to the outer or larger effective area side of the piston $c$ is by way of the non-return valve $e$ which prevents flow in a direction away from the piston so that the trapped fluid acts as a dashpot to prevent rapid movements or lifting of the bronze or shoe due to the varying loads on the shaft within it.

An air venting plug $g$ may be fitted to the top of the cylinder in which the piston moves.

Whilst it is only necessary for the pressure head of the hydraulic fluid to be sufficient to ensure satisfactory filling of the spaces at the opposite sides of the piston, a greater pressure may be employed if necessary. The spring $i$ may be a light or a heavy spring to suit requirements.

The valve $e$ may be arranged in the piston $c$ as shown in Figure 2 instead of in the cylinder wall.

With my improvement I am enabled to approximate to ideal bearing conditions for I can give a very light permanent loading of the bearing by the spring $i$ and effectively prevent lifting of the bearing.

The level in the reservoir $r$ may be float controlled, or such level may be restored at intervals. The loss of oil from the system is at a slow rate.

What I claim is:

1. Loading means for a spindle bearing comprising a piston operatively connected to the bearing, a spring loading said piston and bearing, a passage for hydraulic fluid leading to the opposite sides of said piston, and a non-return valve preventing escape of fluid along said passage from the side of the piston loaded by the spring.

2. Loading means for a spindle bearing comprising a piston operatively connected with the bearing, a spring loading said piston and bearing, a passage for hydraulic fluid leading to one side of the piston, a passage through the piston for the passage of hydraulic fluid to the other side of the piston where the loading spring acts, and a non-return valve in said passage opening towards the side of the piston at which the loading spring acts.

3. In loading means for a spindle bearing as claimed in claim 1, supplying hydraulic fluid by gravity to the opposite sides of the piston from a low level but raised tank.

4. In loading means for a spindle bearing as claimed in claim 2, supplying hydraulic fluid by gravity to the opposite sides of the piston from a low level but raised tank.

5. A spindle journal bearing which has a spring load applied thereto for running adjustment and a hydraulic lock to prevent lifting of the bearing.

HARRY HALES ASBRIDGE.